United States Patent [19]

Berg et al.

[11] 4,124,280
[45] Nov. 7, 1978

[54] ACOUSTIC-OPTIC TECHNIQUE FOR PROCESSING MANY SIGNALS SIMULTANEOUSLY

[75] Inventors: Norman J. Berg, Baltimore, Md.; James T. Karam, Jr., Reston, Va.

[73] Assignee: The United States of America as represented by the Secretary of the Army, Washington, D.C.

[21] Appl. No.: 804,202

[22] Filed: Jun. 7, 1977

[51] Int. Cl.² .................................................. G02F 1/32
[52] U.S. Cl. ....................................... 350/358; 350/169
[58] Field of Search ................... 350/350, 169, 96.13, 350/96.14, 358; 333/30 R, 72

[56] References Cited
U.S. PATENT DOCUMENTS 3,919,700  11/1975  Cozzo et al. .................... 350/358
4,012,120  3/1977  Kagiwada et al. ................ 350/358

Primary Examiner—William L. Sikes
Attorney, Agent, or Firm—Nathan Edelberg; Robert P. Gibson; Saul Elbaum

[57] ABSTRACT

An acousto-optic apparatus utilizing multiplexing techniques, for obtaining the correlation of N pairs of signals. First and second sets of signals are combined in a piezoelectric crystal, and each signal in the first set is correlated only with its pair signal in the second set, that is, with the signal in the second set which has the same R.F. frequency. Each signal is a composite signal comprised of an envelope modulating an R.F. signal, and when a laser beam is directed across the interaction area of the crystal and directed onto a square law detector, the correlation of the envelopes of the N pairs of signals is obtained.

3 Claims, 5 Drawing Figures

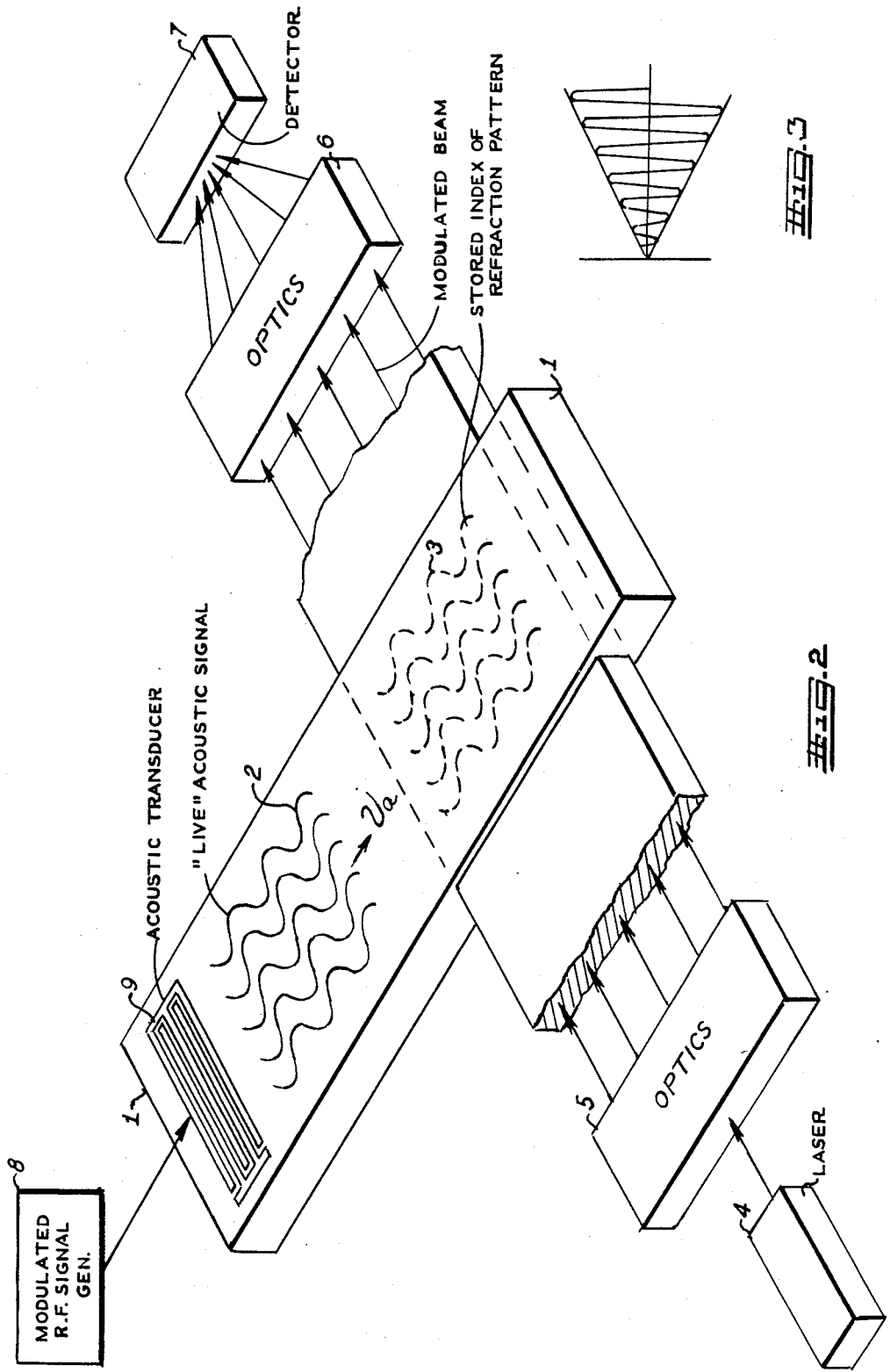

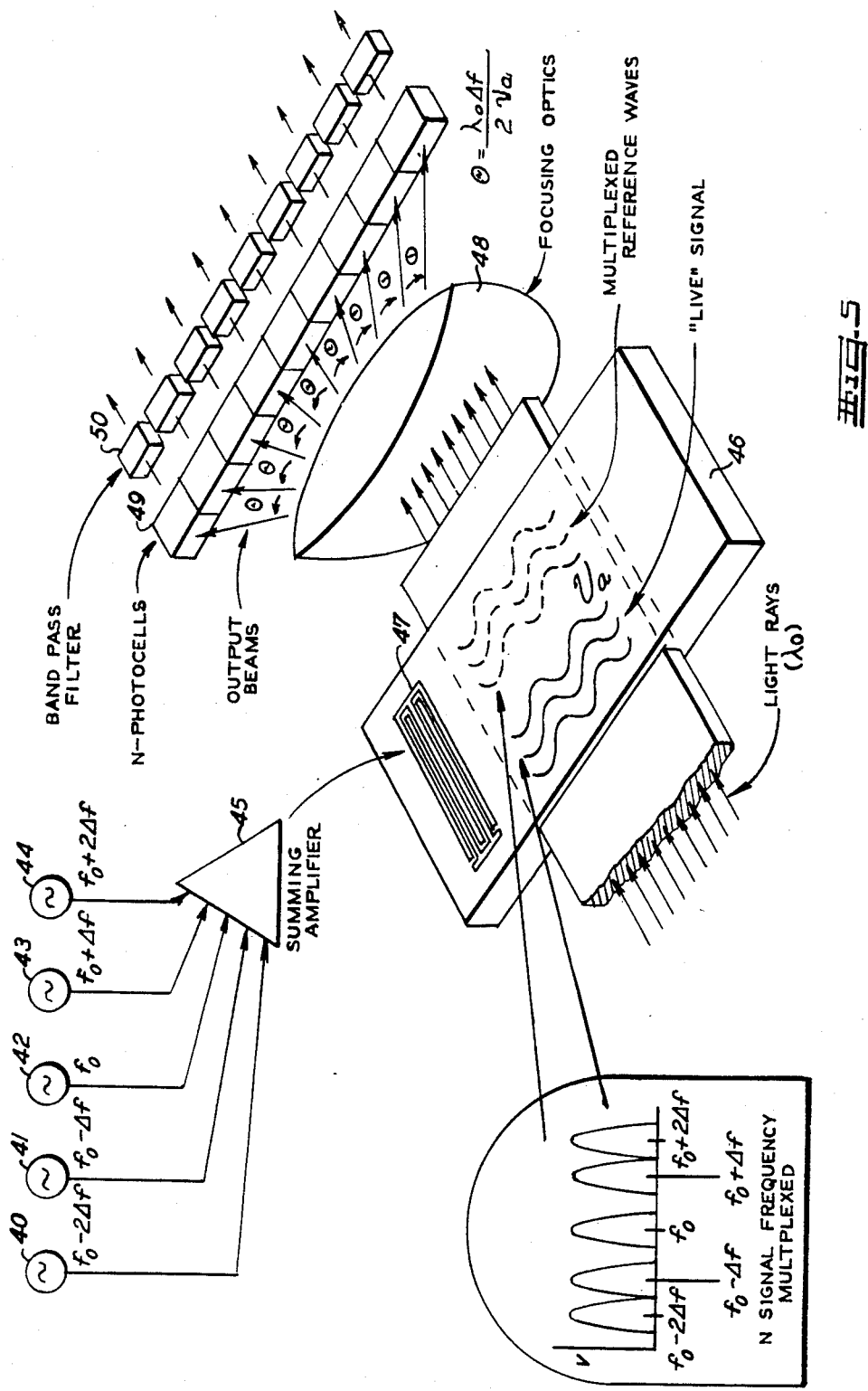

ACOUSTIC-OPTIC TECHNIQUE FOR PROCESSING MANY SIGNALS SIMULTANEOUSLY

RIGHTS OF THE GOVERNMENT

The invention described herein may be manufactured, used, and licensed by or for the United States Government for governmental purposes without the payment to us of any royalty thereon.

The present invention is directed to an acousto-optic correlation using multiplexing techniques for processing a plurality of signals simultaneously.

Reference will be made in the specification to Application Ser. Nos. 804,203 and 804,206, both of which were filed on June 7, 1977, and along with this application, are assigned to the U.S. Government.

In co-pending Patent Application Ser. No. 804,203 an acousto-optic device for obtaining the correlation of two real-time signals is disclosed. In co-pending Patent Application Ser. No. 804,206 methods for storing a signal in a piezoelectric crystal and apparatus for obtaining the correlation of a real-time signal with the stored signal are disclosed. The present application is directed to an apparatus in which all of the signals of a set can be simultaneously correlated in a single device with respective signals of a second set. Hence, instead of using a plurality of devices to accomplish the separate correlations, a single device is utilized, thereby resulting in a more compact overall arrangement.

It is therefore an object of the invention to provide an apparatus capable of correlating a plurality of pairs of signals, utilizing as small an area as possible.

It is further object of the invention to provide a multiplexed analog correlator, having a large time-bandwidth product, a large dynamic range, and a high degree of isolation between the input and the output.

The invention will be better understood by referring to the accompanying drawings, in which:

FIG. 2 is a diagrammatic illustration of the memory correlator device disclosed in co-pending Application Ser. No. 804,206.

FIG. 3 is a representative waveform which could be applied to the acoustic transducers shown in FIGS. 2 and 5.

Figure 4:
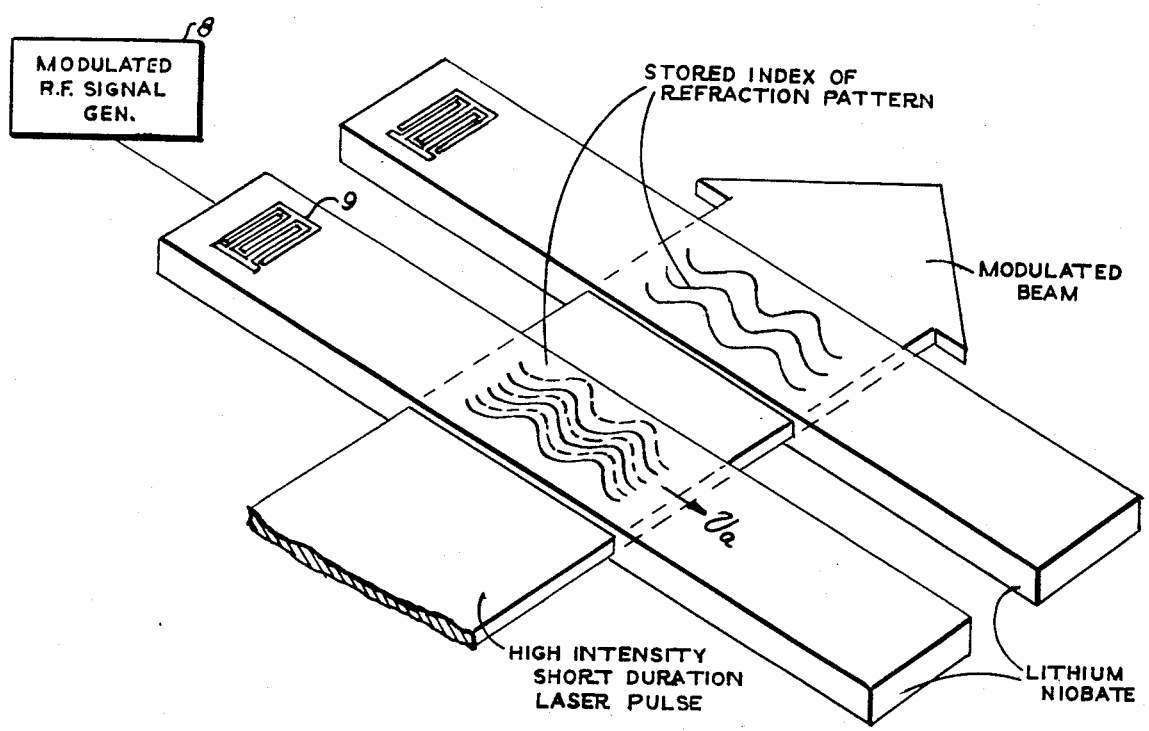

FIG. 4 illustrates two methods, disclosed in co-pending U.S. Application Ser. No. 804,206 for storing signals as index of refraction variation patterns in piezoelectric crystals.

FIG. 5 is a diagrammatic illustration of the apparatus of the present invention.

By way of background, diffraction of light by high frequency sound waves, called Brillouin scattering, was first observed in 1932. The development of the laser and advances in high frequency techniques have increased the practical potential of the acousto-optical interaction phenomenon.

An acoustic wave propagating in a medium causes a spatial change in the index of refraction of the medium as a result of the acoustic strain $s$ according to the relationship:

$$\Delta n = (-n^3 ps)/2$$

where $n$ = index of refraction
$p$ = electro-optic coefficient

A light beam impinging on the acoustic wave is scattered as a result of this index of refraction variation just as if it encountered a diffraction grating. Since the acoustic wave is propagating and momentum must be conserved, the frequency of the light wave is shifted by an amount equal to the acoustic frequency.

Figure 1:
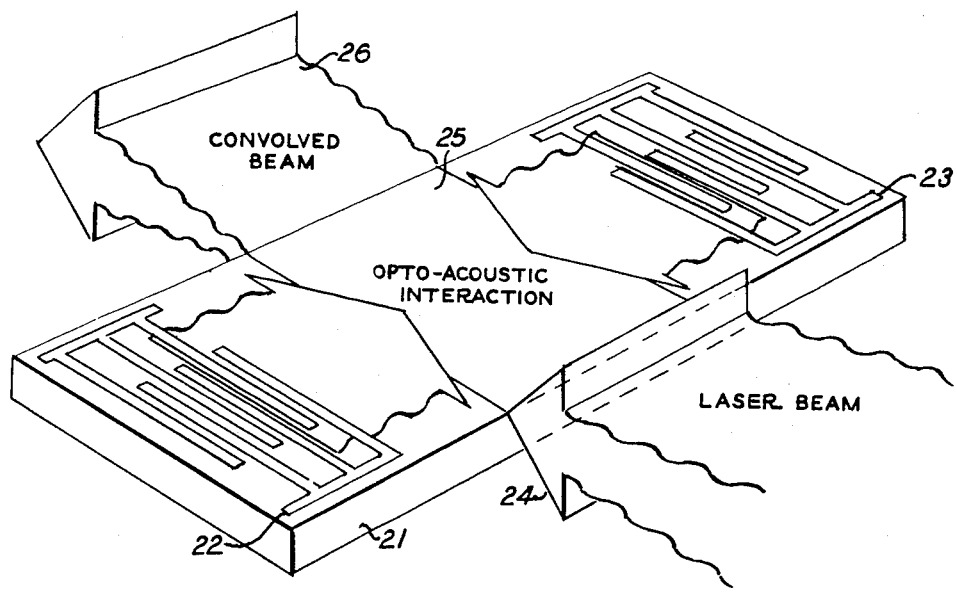
FIG. 1 is a prior art acousto-optic convolver device useful in explaining the background of the present invention.

The principles of operation of the memory correlator of FIGS. 2 and 5 are best understood by first referring to FIG. 1, which is an illustration of an acousto-optic convolver, such as is known to the prior art.

The body of the convolver is an elongated sheet of piezoelectric crystal 21, such as lithium niobate. At respective ends of the crystal, acoustic transducers 21 and 23 are disposed, and such transducers are known means for converting an electrical signal to a corresponding acoustic wave. A laser, such as a helium-neon laser is arranged to direct a light beam across the top part of the crystal as shown in FIG. 1.

An electrical signal of the form $A(t) \cos w_1 t$ is applied to transducer 21 and a signal of the form $B(t) \cos w_1 t$ is applied to transducer 23 where $w_1$ is an R.F. frequency signal which is amplitude modulated by the envelopes $A(t)$ and $B(t)$ where $A(t)$ and $B(t)$ are the signals which are to be convolved with each other. The acoustic waves launched by the respective transducers cross each other in the middle area of the crystal. The light beam, which can be represented by $I_o \cos Wt$ traverses the surface of the crystal in the middle area and is diffracted by the acoustic waves. The intensity of the diffracted light beam is of the form $$K^2 I_o (A(t) B(t) \cos (W - 2w_1)t$$

This doubly diffracted light beam is focussed on a square-law detector diode and the diode output voltage at double the acoustic frequency is $$V_{out} \sim A(t)B(t)\cos(2w_1)$$

If $A(t)$ and $B(t)$ are pulses whose widths are shorter than the interaction region encompassed by the light beam in FIG. 1, then the focussing process is equivalent to an integration with respect to time. Since the two waves are passing each other, the output varies with respect to a delay time T where T varies from zero, when both pulses overlap, to some maximum value determined by the length of the interaction region. For the conditions described, the output voltage as a function of time is given by $$V_0(T) = \int_{-\infty}^{+\infty} A(t)B(t - T)dt,$$

which is equivalent of the convolution of $A(t)$ and $B(t)$.

As is known, it is frequently more useful to obtain the correlation instead of the convolution of two signals. The correlation is defined as $$V_0(T) = \int_{-\infty}^{+\infty} A(t)B(t + T)dt$$

and as can intuitively be understood on the basis of the above discussion, if one acoustic wave is slowly "slid" past the other wave while travelling in the crystal in the same direction, the correlation of the two waves is obtained.

It is only necessary that one wave travel slowly enough with respect to the other wave so that the faster wave can slide entirely past the slower wave within the length of the crystal. In co-pending Application Ser. No. 804,203, an arrangement was disclosed in which two crystals having different acoustic velocities were utilized and both waves were generated in real time, with the faster wave sliding past the slower wave. According to the memory correlator of FIG. 2, one wave is stored in the crystal and the wave generated in real time slides past the stored wave to effect the correlation.

The methods provided by the invention for storing signals in piezoelectric crystals will now be discussed.

As mentioned above, the interaction of the light beam with the acoustic wave is a direct result of the spatial change in index of refraction which the acoustic wave produces as a result of the acoustic strain $s$, where $$\Delta n = (-n_o^3 p s)/2$$

According to the invention disclosed in co-pending Application Ser. No. 804,206 a method is provided for storing in the piezoelectric material a spatial variation in an index of refraction pattern which corresponds to an acoustic wave. Then, correlation can proceed with the stored wave just as with the original wave. Basically, intense second harmonic laser radiation of 0.53 microns is used to "freeze" a wave, and store it semi-permanently in the crystal.

More specifically, the method for storing the signal in the crystal are illustrated in FIG. 4. The signals of interest are modulated R.F. signals, the envelope of the composite signal being the signal to be correlated. A representative signal is shown in FIG. 3, wherein the envelope of the composite signal is a rising ramp. As recognized by those skilled in the art, the envelope may be any desired waveshape.

The modulated R.F. signal is generated by generator 8 in FIG. 4, which can for instance be a frequency synthesizer which is switched on and off by a pulse generator. The signal is applied to acoustic transducer 9, the exact form of which is known to those skilled in the art, and which converts the electrical signal to an acoustic signal which is propagated across the length of lithium niobate crystal 1. At a selected area of the crystal, a spatially wide, high intensity, short duration laser pulse at 0.53 microns is directed across the surface of the crystal. This effectively "freezes" the propagating waveform in the irradiated area as a spatially varying index of refraction pattern. To accomplish this, the laser pulse must be short compared to the width of an R.F. cycle, and in an illustrative embodiment, the pulse width was approximately 10% of the width of an R.F. cycle. Thus, if the R.F. signal to be stored is at a frequency of 10 MHz, the pulse duration would be 10 ns, and the laser beam, by way of example, could have an intensity of approximately 1 J/cm². The 0.53 micron radiation is second harmonic radiation obtained from a 1.06 micron output laser. If the 0.53 micron second harmonic and the 1.06 micron fundamental are utilized simultaneously, a factor of 3 enhancement in the index of refraction change results.

The physical basis for the index of refraction change is believed to be the photocarriers produced by the laser beam. Regions of the material which have a higher density will therefore produce more photocarriers and hence result in larger $\Delta n$. The propagating acoustic wave varies the density, since the dilation $\Delta \rho/\rho$ is equal to the strain $s$. That is to say, that for the small perturbations with which we are dealing, the non-linear $\Delta n$ variation resulting from exposure to the high-intensity second harmonic pulse should be proportional to $\Delta \rho/\rho$. So, if we cause an acoustic wave to propagate in LiNbO$_3$ and then expose this to a high-intensity short-duration SH beam, a pattern of spatial variation in $\Delta n$ should result corresponding to the original acoustic signal. Therefore:

$$\Delta n \sim J^2 s/\tau,$$

where
  $J$ = energy density in Joules/cm²
  $\tau$ = laser pulse width in nanoseconds.

The magnitude of the strain $s$ is given by:

$$s \sim \sqrt{\frac{2P_s}{\rho v^3}}$$

where
  $P_s$ = the acoustic power density in erg-sec/cm²,
  $\rho$ = density = 4.64 g/cm² (LiNbO$_3$), and
  $v$ = acoustic velocity ~3.5 × 10⁵ cm/sec (LiNbO$_3$).

The maximum acoustic power density which we can utilize is determined by the onset of nonlinearity in the piezoelectric material, i.e., exceeding the Hooke's Law regime of operation. For LiNbO$_3$ this maximum power density is given by $$P_{sm} = 80\sqrt{F} \text{ (watts/cm}^2\text{)}$$

where $F$ is the frequency in MHz.

Combining the above equations and substituting numerical values yields:

$$\Delta n = 2.7 \times 10^{-8} \times J^2 \tau^{-1} (F)^{\frac{1}{4}},$$

where the factor of 3 enhancement obtained by simultaneous 1.06 micron irradiation has been included. This value for $\Delta n$ assumes that a single pulse has been used. With correct timing many pulses can be utilized, therefore:

$$\Delta n = 2.7 \times 10^{-8} \times \frac{NJ^2}{\tau} (F)^{\frac{1}{4}}$$

where: $N$ = number of pulses.

$$\Delta n = 2.7 \times 10^{-7} \times \frac{NJ^2}{(\tau)^{5/4}}$$

is the maximum change in index of refraction for a given laser pulse width.

Referring to FIG. 4, a second method is illustrated for storing the acoustic wave in a crystal. This method is the same as the first method except that the modulated beam after it traverses the surface of the crystal, is made incident on a second lithium niobate crystal. This has the effect of storing the index of refraction pattern in the second crystal, and the pattern which is stored will be approximately 100 times stronger than the pattern which is stored in the first crystal.

The limitations on the density of stored signals via the above processes are the inherent resolution (4000 lines/mm) and the availability of very short pulse-width lasers. Mode-locked neodymium/glass lasers have a pulse width of 10 ps. This together with the observed resolution implies that acoustic signals up to 10 GHz can be stored. Surface acoustic wave technology is presently limited to a few gigahertz, however. If we assume a frequency maximum of 2 GHz and a half cycle as the smallest storable signal, the density of stored images at this frequency would be 10,000 per cm length of $LiNbO_3$. The attenuation of SAW at this frequency is about 10 dB per cm. If we assume that the dynamic range of the acousto-optic correlation is about 60 dB and that we wish to maintain about 30 dB of signal range, we would be limited to about 3 cm or 30,000 stored images. All of these stored images could be scanned and a correlation to any one of them obtained in less than 10 microseconds, which indicates the tremendous potential of the storage device.

If a signal is stored in a crystal according to one of the two above methods, and a second real time signal is then propagated across the crystal so that it "slides" past the stored signal, the correlation of the two signals may be obtained.

Thus, the stored pattern will modulate the laser beam and $$\left(\frac{I_l}{I_o}\right)_{\text{stored pattern}} \propto P_s(t)_{\text{stored}},$$

where the $t$ variable corresponds to the amplitude variation across the length of the signal. The live signal transmitting through the material will modulate the light beam so:

$$\left(\frac{I_l}{I_o}\right)_{\text{live signal}} \propto P_s(t+T)_{\text{live}},$$

where the T variable corresponds to the delay time necessary for the second signal to cross the first signal. The resultant modulated light is hence proportional to the product $P_s(t)_{\text{stored}} \times P_s(t+T)_{\text{real time}}$. If the light is then focussed using a spherical lens onto a PIN square-law photodetector diode, the output is proportional to:

$$\int P_s(t)_{\text{stored}} \times P_s(t+T)_{\text{real time}} dt$$

which is the correlation of the two signals.

FIG. 2 shows an arrangement for obtaining the correlation of a real time signal with the stored signal. Crystal 1 has an index of refraction pattern stored therein as shown, and the real time signal, which would be at the same acoustic of R.F. frequency is provided by Modulated R.F. signal Generator 8. The real time wave is launched by acoustic transducer 9, and is propagated across the stored pattern. A laser beam is directed across the crystal at the area of the stored pattern, and is modulated by the two waves. It is then focussed on square law detector 7, and the output at the acoustic frequency corresponds to the desired correlation. In an actual set-up, a filter at the acoustic frequency would be utilized in the detector circuit.

Optics 5 is an optical configuration, known to those skilled in the art, for providing a wide, thin beam which enters and leaves the acoustic medium approximately perpendicular to the propagating wave. For instance, optics 5, may be comprised of spherical beam expanding lenses followed by cylindrical lenses which expand the beam in the horizontal direction, and focus it in the region of the acoustic medium. Optics 6, which follow the acoustic medium, may be comprised of a cylindrical lens for re-collimating the light and a spherical lens for focussing it on the square law photodetector.

The present invention is illustrated in FIG. 5, and according to the invention, utilizing multiplexing techniques, N pairs of signals can be correlated with each other in a single acoustic-optic device. This is because of the property that where a number of pairs of signals are present in the device at the same time, where both signals of a pair have the same R.F. frequency, different from the R.F. frequencies of the other pairs, each signal will interact only with the other signal of the pair of which it is one, but will not interfere with signals having different R.F. frequencies. The multiplexing concept of the invention is applicable to both the real time correlator and the memory correlator mentioned above, but is illustrated in FIG. 5 with respect to the memory correlator.

In FIG. 5, crystal 46 has a plurality of signals stored therein over the same surface area as overlapping spatially varying index of refraction patterns. The signals may be stored by the same methods described above, but to store N signals, each of bandwidth $\Delta f$ requires a total operational bandwidth of $N\Delta f$, which in practical terms means increasing the bandwidth of the transducers and decreasing the pulse width of the high-powered laser pulse used for storing the signals. A bandwidth of well over a gigahertz should be obtainable.

Each of the stored signals is at a different R.F. frequency, with the frequency spectrum of a set of signals being illustrated at the lower left-hand part of the Figure.

Each of the modulated R.F. electrical signals generated by generators 40 to 44 is at the same R.F. frequency as one of the stored signals. The electrical signals are applied to summing amplifier 45, and from there to acoustic transducer means 47, which results in N acoustic waves being simultaneously propagated across the crystal. As mentioned above, each real time signal interacts only with the stored signal having the same R.F. frequency, and the laser beam is modulated by all of the acoustic waves.

The laser beam traverses the crystal, and is then focussed by optics 48, the exact form of which are known to those skilled in the art, onto a plurality of spaced photodetectors. Each of the correlation signals exits from the optics at an angle $\theta$ away from the adjacent signal where $\theta = (\lambda_o \Delta f)/2 Y_a$ — $\lambda_o$ being the wavelength of the laser light and $Y_a$ being the acoustic velocity. Thus, the correlation signals are effectively separated from each other, and each can be directed to a different photodetector 49, for independent processing, if desired. For a $\Delta f$ of 40 MHz, $\theta \cong 0.2°$ and since detector diodes can be made as small as a mil in diameter, the difference in angle is sufficient for separating the signals. Each photodetector is connected to a separate band pass filter 50, each filter having a center frequency equal to the R.F. frequency of a different processed signal.

We wish it to be understood that we do not desire to be limited to the exact details of construction shown and described, for obvious modifications can be made by a person skilled in the art.

We claim:

1. An acousto-optic apparatus for processing first and second sets of composite signals and for obtaining the correlation of the envelope for each composite signal in said first set with the envelope of a respective composite signal in said second set, comprising, a piezoelectric crystal having said second set of composite signals stored therein as respective overlapping index of refraction variation patterns over a given surface area of said crystal, each of said stored composite signals being comprised of an R.F. signal modulated by an envelope, with the R.F. frequency of each composite signal in said second set being different from the R.F. frequency of each other signal in said set, said crystal having acoustic transducer means disposed thereon to one side of said given surface area for converting electrical signals which are applied thereto to corresponding acoustic signals, said first set of composite signals comprising a set of electrical signals, each of said electrical signals being comprised of an R.F. signal modulated by an envelope, with the R.F. frequency of each composite signal in said first set being different from the R.F. frequency of each other signal in said set of said first set being the same as the R.F. frequency of one signal of said second set of signals, means for applying said first set of composite signals to said acoustic transducer means, laser means directed to transmit a laser beam across said given surface area and detector means for detecting said laser beam after it traverses said surface portion.

2. The apparatus of claim 1 wherein each of said first and second sets consists of N signals, and said detector means is comprised of N photodetectors.

3. The apparatus of claim 2 further including a band pass filter connected to each photodetector, the center frequency of each of said filters corresponding to one of said different R.F. frequencies.

* * * * *